(12) United States Patent
Kim et al.

(10) Patent No.: US 10,550,878 B2
(45) Date of Patent: Feb. 4, 2020

(54) HOLLOW DRIVE SHAFT FOR VEHICLE AND MANUFACTURING METHOD THEREOF

(71) Applicant: Hyundai Motor Company, Seoul (KR)

(72) Inventors: Jang Ho Kim, Yongin-Si (KR); Sung Su Yoo, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 927 days.

(21) Appl. No.: 14/950,470

(22) Filed: Nov. 24, 2015

(65) Prior Publication Data
US 2016/0305469 A1    Oct. 20, 2016

(30) Foreign Application Priority Data
Apr. 14, 2015    (KR) .................... 10-2015-0052117

(51) Int. Cl.
*F16C 3/02*    (2006.01)
*B21D 53/84*    (2006.01)

(52) U.S. Cl.
CPC ............. *F16C 3/023* (2013.01); *B21D 53/84* (2013.01)

(58) Field of Classification Search
CPC ........ B21D 53/84; B21D 51/10; B21D 53/88; F16C 3/02; F16C 3/023; Y10T 464/50; B60K 17/22; B21K 1/06
USPC ................................................ 464/179, 183
See application file for complete search history.

(56) References Cited

U.S. PATENT DOCUMENTS

| | | | |
|---|---|---|---|
| 1,979,969 A * | 11/1934 | Geyer ...................... | F16C 3/02 464/89 |
| 3,552,804 A * | 1/1971 | Bracken, Jr. ............ | F01D 5/026 384/99 |
| 4,273,207 A * | 6/1981 | Sivers ...................... | B60K 5/02 138/149 |
| 6,254,488 B1* | 7/2001 | Hill ........................ | B21D 26/051 464/180 |
| 6,409,606 B1 | 6/2002 | Nakajima et al. | |
| 8,118,064 B2 | 2/2012 | Nakajima et al. | |
| 2008/0293504 A1 | 11/2008 | Campbell | |
| 2011/0124421 A1* | 5/2011 | Kienhofer .............. | B21D 53/84 464/183 |

FOREIGN PATENT DOCUMENTS

| | | |
|---|---|---|
| CN | 1035451 A | 9/1989 |
| CN | 101105196 A | 1/2008 |

(Continued)

OTHER PUBLICATIONS

Kim, Injo, "Experimental Study for Enhancement of Material Strength in Cold Cross Wedge Rolling Process," Inha University Graduate School Mechanical Engineering Dept., Feb. 2006.

*Primary Examiner* — Matthieu F Setliff
(74) *Attorney, Agent, or Firm* — Morgan, Lewis & Bockius LLP (57) ABSTRACT

A method of manufacturing a hollow drive shaft for a vehicle may include swaging one of a first hollow tube and a second hollow tube having a same diameter to reduce an outer diameter thereof and thus allow the swaged hollow tube to be assembled in a remaining hollow tube of the first hollow tube and the second hollow tube, assembling the hollow tube that is reduced in outer diameter in the remaining hollow tube, thereby forming a hollow shaft, and joining first and second stems to both sides of the hollow shaft, respectively.

3 Claims, 5 Drawing Sheets

(56) References Cited

FOREIGN PATENT DOCUMENTS

| | | |
|---|---|---|
| JP | 59-50216 A | 3/1984 |
| JP | 62-6528 U | 1/1987 |
| JP | 2544823 Y2 | 5/1997 |
| JP | 2010-249145 A | 11/2010 |
| KR | 1992-0005025 B1 | 6/1992 |
| KR | 1993-0012136 A | 7/1993 |
| KR | 10-2008-0096900 A | 11/2008 |
| KR | 10-2013-0122463 A | 11/2013 |

* cited by examiner

HOLLOW DRIVE SHAFT FOR VEHICLE AND MANUFACTURING METHOD THEREOF

CROSS-REFERENCE(S) TO RELATED APPLICATION

The present application claims priority to Korean Patent Application Number 10-2015-0052117 filed Apr. 14, 2015, the entire contents of which is incorporated herein for all purposes by this reference.

BACKGROUND OF THE INVENTION

Field of the Invention

The present invention relates to a hollow drive shaft for a vehicle and a manufacturing method thereof. More particularly, the invention relates to a hollow drive shaft for a vehicle and a manufacturing method thereof, which are intended to improve durability by enhancing physical properties without an increase in size.

Description of Related Art

Generally, a vehicle is equipped with a drive shaft to transmit power of an engine from a transaxle to left and right wheels of the vehicle, the transaxle being driven by power shift from a transmission.

The drive shaft is configured to be connected between a fixed center type constant velocity joint coupled to the left and right wheels and a slidable constant velocity joint coupled to the transaxle, thus transmitting power from the transaxle to the left and right wheels of the vehicle and thereby allowing the vehicle to be driven.

Figure 1:
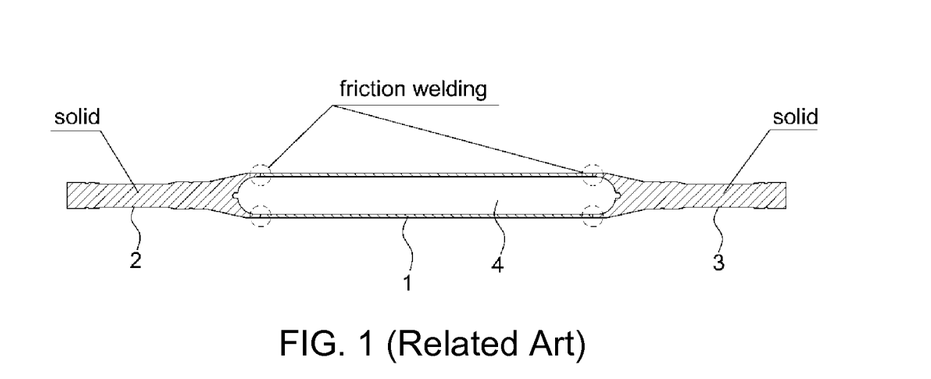
FIG. 1 is a sectional view schematically showing a conventional hollow drive shaft for a vehicle according to the related art.

FIG. 1 is a sectional view schematically showing a conventional hollow drive shaft for a vehicle.

As shown in FIG. 1, the conventional hollow drive shaft includes a hollow shaft 1 that is provided on a central region thereof and has a hollow portion 4 extending in a direction of a rotation axis, and first and second stems 2 and 3 that are welded to both sides of the hollow shaft 1, respectively.

The conventional hollow drive shaft is made by joining the hollow shaft 1 at the central region to the stems 2 and 3 on both sides through a friction welding method in which parts (i.e. the hollow shaft and the first and second stems) are welded with pressure using frictional heat generated during the relative rotation of the welded parts.

Such a hollow drive shaft is higher in rigidity and strength compared to a solid drive shaft simply having a solid portion without having a hollow portion at the central region, thus leading to an increase in natural frequency. Consequently, the hollow drive shaft advantageously permits a damper to be eliminated, in addition to reducing a weight.

The damper is sensitive to temperature change and is deteriorated in performance for several reasons, such as rubber curing, over time. Thus, in the conventional hollow drive shaft, the elimination of the damper may cause several problems.

Meanwhile, an internal-combustion-engine vehicle performs forward movement rather than rearward movement and does not perform regenerative braking, so that the drive shaft is mainly driven under a unidirectional-movement condition in which torsion torque is applied in the forward movement direction of the vehicle. In contrast, in an eco-friendly vehicle performing the regenerative braking, such as a hybrid vehicle or an electric vehicle, the drive shaft is driven under a bidirectional-movement condition in which the torsion torque is applied in the forward movement direction of the vehicle at the time of the travel but is applied in the rearward movement direction of the vehicle at the time of the regenerative braking.

Therefore, if the hollow drive shaft, which does not consider the bidirectional-movement condition required for the eco-friendly vehicle, is mounted to the eco-friendly vehicle, durability is poor in the bidirectional movement and thereby the drive shaft may be undesirably damaged.

In order to solve the problem where such a drive shaft is damaged, a method of increasing the size of the drive shaft has been conventionally proposed. However, this may lead to an increase in diameter of the drive shaft, so that it is disadvantageous in terms of a layout.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hollow drive shaft for a vehicle and a manufacturing method thereof, which are intended to improve durability by enhancing physical properties without an increase in size of the drive shaft.

Further, various aspects of the present invention are directed to providing a hollow drive shaft for a vehicle and a manufacturing method thereof, which are enhanced in bidirectional-movement durability to cope with an external force exerted from an outside in the bidirectional-movement condition of an eco-friendly vehicle.

According to various aspects of the present invention, a method of manufacturing a hollow drive shaft for a vehicle may include swaging one of a first hollow tube and a second hollow tube having a same diameter to reduce an outer diameter thereof and thus allow the swaged hollow tube to be assembled in a remaining hollow tube of the first hollow tube and the second hollow tube, assembling the hollow tube that is reduced in outer diameter in the remaining hollow tube, thereby forming a hollow shaft, and joining first and second stems to both sides of the hollow shaft, respectively.

The method may further include applying torsion torque to the first and second hollow tubes in different directions, respectively, between the swaging and the assembling.

The method may further include applying torsion torque to the first and second hollow tubes in different directions, respectively, between the assembling and the joining.

The method may further include applying torsion torque to one of the first and second hollow tubes, between the swaging and the assembling.

The method may further include applying torsion torque to one of the first and second hollow tubes, between the assembling and the joining.

The method may further include applying torsion torque to the first and second hollow tubes in a same direction, respectively, between the swaging and the assembling.

The method may further include applying torsion torque to the first and second hollow tubes in a same direction, respectively, between the assembling and the joining.

According to various aspects of the present invention, a hollow drive shaft for a vehicle may include a hollow shaft, and first and second stems joined to left and right sides of the hollow shaft, in which the hollow shaft may be configured such that one of a first hollow tube and a second hollow tube is inserted into a remaining hollow tube of the first hollow tube and the second hollow tube.

The hollow shaft may be formed by reducing an outer diameter of one of the first and second hollow tubes having a same diameter through swaging, and then inserting the hollow tube having the reduced outer diameter into the remaining hollow tube.

One of the first and second hollow tubes may be subjected to swaging, such that an outer diameter thereof is reduced to be less than an inner diameter of the remaining hollow tube, and then torsion torque is applied to the first and second hollow tubes, respectively, in different directions to be twisted.

The hollow shaft may have therein a hollow portion extending along a rotation axis, each of the first and second stems having a solid shape having no hollow portion therein or having a hollow shape that extends along the rotation axis.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
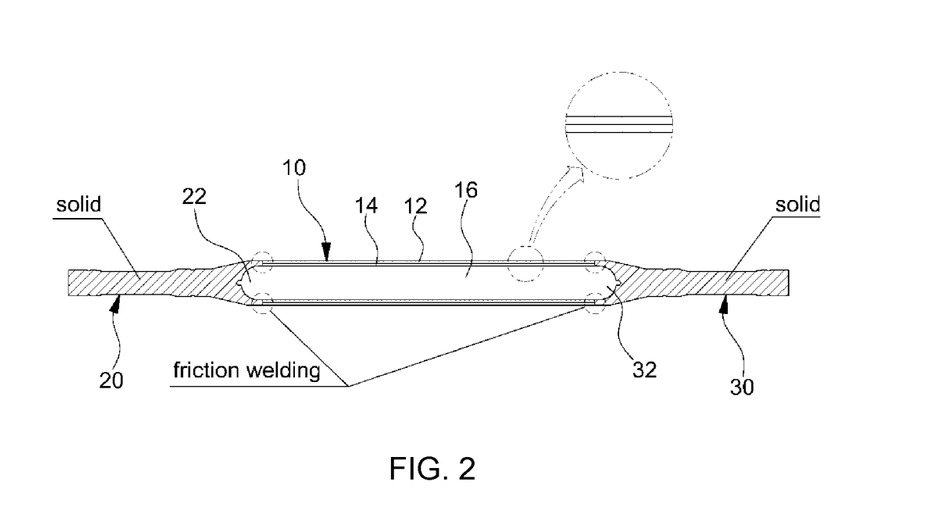
FIG. 2 is a sectional view schematically showing an exemplary hollow drive shaft for a vehicle according to the present invention.

As shown in FIG. 2, a hollow drive shaft according to the present invention includes a hollow shaft 10 having therein a hollow portion 16 that extends along a rotation axis, and first and second stems 20 and 30 joined to left and right sides of the hollow shaft 10.

The hollow shaft 10 is made by assembling two hollow tubes 12 and 14 machined to have different characteristics with each other. One of the first hollow tube 12 and the second hollow tube 14 having the same diameter is compressed by a swaging process to reduce an outer diameter thereof, and then is inserted into the other hollow tube.

Each of the first and second hollow tubes 12 and 14 is a hollow body having a circular cross-section, and is of a cylindrical structure that has, in a central portion thereof, the hollow portion 16 extending along the rotation axis and that is open at both ends thereof.

Further, the first and second stems 20 and 30 are joined to both ends of the hollow shaft 10 by a friction welding method that performs pressure welding using frictional heat generated when welded parts (hollow shaft and stems) rotate relative to each other.

Each of the first and second stems 20 and 30 is a hollow body or a non-hollow body having an approximate circular cross-section, and is of a hollow shape that has a hollow portion extending along the rotation axis, or a solid shape that has no hollow portion. As shown in FIG. 2, in the case of the non-hollow body, hollow portions 22 and 32 which are partially concave are provided on an end of the non-hollow body connected to the hollow shaft 10.

Hereinafter, the method of manufacturing the hollow drive shaft configured as such will be described with reference to FIGS. 3 and 4.

First, the method of manufacturing the hollow drive shaft according to various embodiments of the present invention will be described with reference to FIG. 3.

Figure 3:
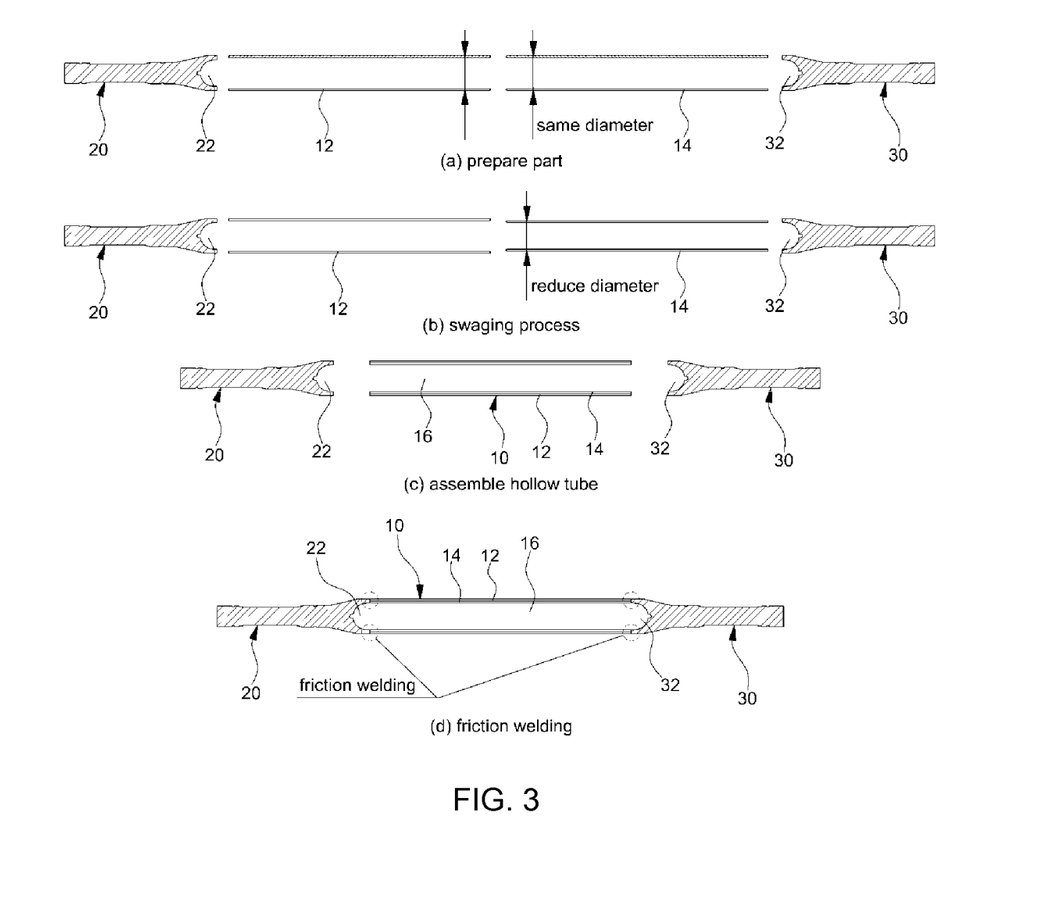
FIG. 3 is a schematic view sequentially showing steps of a method of manufacturing an exemplary hollow drive shaft for a vehicle according to the present invention.

As shown in FIG. 3, the first and second hollow tubes 12 and 14 having the same diameter are fabricated and prepared, and then the first and second stems 20 and 30 are fabricated and prepared. One of the first and second hollow tubes 12 and 14 is compressed by swaging to reduce the outer diameter thereof, and then is inserted into the other hollow tube.

In the manufacturing method shown in FIG. 3, the second hollow tube 14 is subjected to swaging such that the outer diameter of the second hollow tube 14 is less than the inner diameter of the first hollow tube 12. Accordingly, the diameter of the second hollow tube 14 is reduced and then the second hollow tube 14 is inserted into the first hollow tube 12.

Although not shown in the drawings, before or after the second hollow tube 14 is inserted into the first hollow tube 12, torsion torque may be applied to the first and second hollow tubes 12 and 14 in the same direction and, thus each of the hollow tubes 12 and 24 may be twisted.

Here, the first and second hollow tubes 12 and 14 and the first and second stems 20 and 30 are generally made of a material used when the hollow drive shaft is manufactured.

After the second hollow tube 14 is inserted into the first hollow tube 12 to manufacture the hollow shaft, the first stem 20 and the second stem 30 are joined to the left and right sides of the hollow shaft 10, respectively, by friction welding using frictional heat, so that the hollow drive shaft is manufactured.

In the hollow drive shaft manufactured as such, the physical properties (strength and the like) of the second hollow tube 14 are increased by swaging. Thus, if it has the same thickness as the conventional hollow shaft, performance such as a torsion rigidity ratio and a natural frequency is increased. Consequently, in comparison with the conventional hollow drive shaft having the same performance, a size and a weight may be reduced, so that fuel efficiency may be enhanced due to a reduction in weight and it is more advantageous in terms of layout.

In addition, when the hollow drive shaft manufactured as such is applied to the internal-combustion-engine vehicle driven under the unidirectional movement condition, the effect of improving durability may be obtained under the unidirectional movement condition where the torsion torque is applied to the drive shaft only in the forward movement direction of the vehicle.

Next, a method of manufacturing a hollow drive shaft according to various embodiments of the present invention will be described with reference to FIG. 4.

Figure 4:
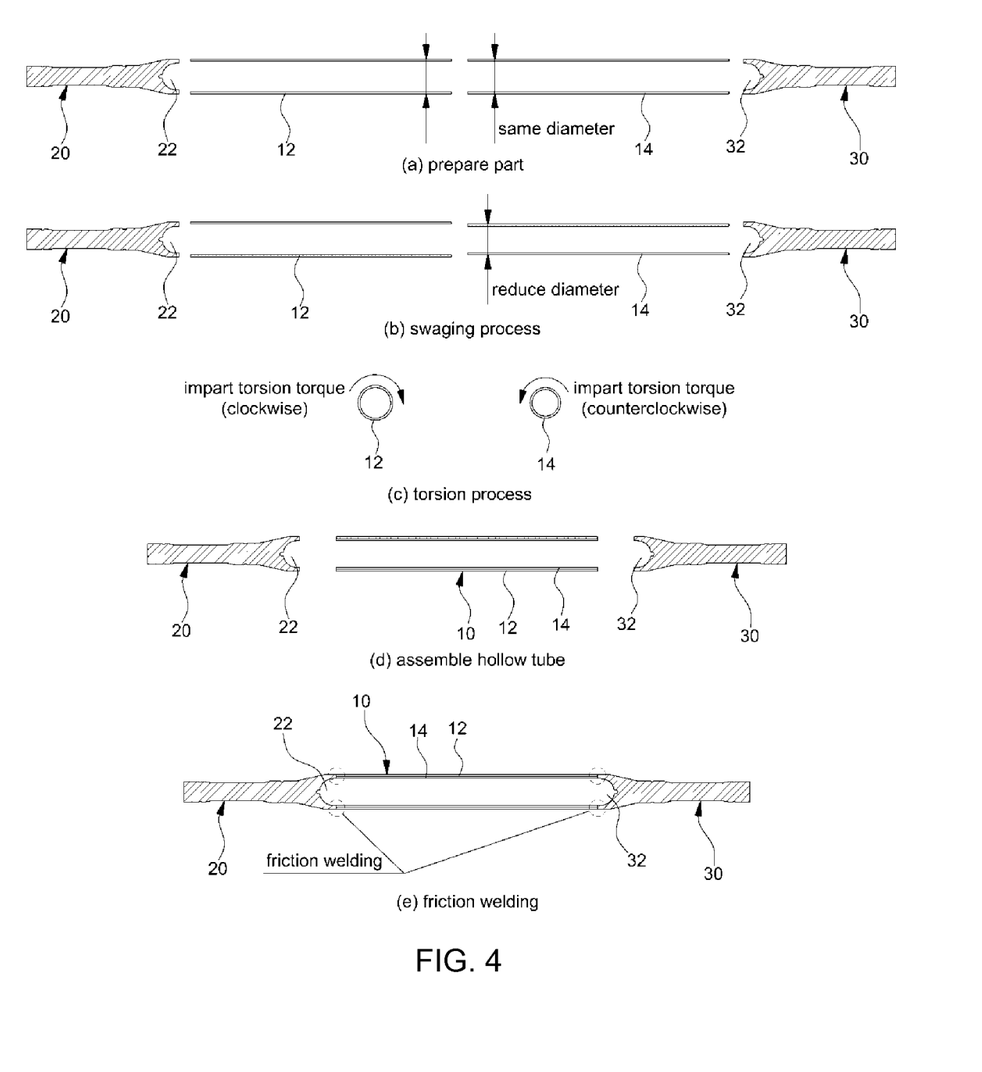
FIG. 4 is a schematic view sequentially showing steps of a method of manufacturing an exemplary hollow drive shaft for a vehicle according to the present invention.

As shown in FIG. 4, the first and second hollow tubes 12 and 14 having the same diameter are fabricated and prepared, and the first and second stems 20 and 30 are fabricated and prepared. Subsequently, the second hollow tube 14 is subjected to swaging so that the outer diameter of the second hollow tube 14 is less than the inner diameter of the first hollow tube 12, and consequently the diameter of the second hollow tube 14 is reduced.

Further, torsion torque is applied to the first and second hollow tubes 12 and 14 in different directions, so that the first and second hollow tubes 12 and 14 are twisted in different directions.

For example, torsion torque is applied to the first hollow tube 12 clockwise, so that it is twisted clockwise. In contrast, torsion torque is applied to the second hollow tube 14 counterclockwise, so that it is twisted counterclockwise.

The first and second hollow tubes 12 and 14 are twisted in different directions by applying the torsion torque so that durability against a reverse external force resulting from the residual stress of the first and second hollow tubes 12 and 14 is enhanced.

Although not shown in the drawings, it is possible to apply torsion torque to one of the first and second hollow tubes 12 and 14 to be twisted.

After the second hollow tube 14 is inserted into the first hollow tube 12 to make the hollow shaft 10, the first and second stems 20 and 30 are joined to the left and right sides of the hollow shaft 10 through friction welding, thereby manufacturing the hollow drive shaft.

Although not shown in the drawings, after the second hollow tube 14 is inserted into the first hollow tube 12 to make the hollow shaft 10, it is possible to apply torsion torque to the first and second hollow tubes 12 and 14, which are assembled with each other, in different directions.

Even in this case, it is possible to apply torsion torque to one of the first and second hollow tubes 12 and 14 to be twisted.

Further, when torsion torque is applied to the cylindrical hollow tubes 12 and 14, for example, in the state where one end of the hollow tubes 12 and 14 is fixedly supported, torsion torque is applied to the other end of the hollow tubes 12 and 14 by rotating it in one direction to be twisted in one direction.

Here, since the cylindrical hollow tubes 12 and 14 formed to be twisted by applying torsion torque thereto is known to those skilled in the art, a detailed description thereof will be omitted.

The hollow drive shaft manufactured in this way previously imparts torsion torques of different directions to the first and second hollow tubes 12 and 14 constituting the hollow shaft 10, thereby increasing durability against external force in the bidirectional-movement condition of the vehicle. Therefore, the invention may reduce the size and weight of the hollow drive shaft compared to the conventional hollow drive shaft having the same durability. As a result, fuel efficiency is enhanced due to the lightness of the hollow drive shaft, and besides the hollow drive shaft of this invention is more advantageous in terms of layout.

In addition, when the hollow drive shaft manufactured as such is applied to an internal-combustion-engine vehicle driven under the unidirectional movement condition, durability may be enhanced under the unidirectional movement condition where torsion torque is applied to the drive shaft mainly in a forward direction. Moreover, when the hollow drive shaft of this invention is applied to an eco-friendly vehicle driven under the bidirectional-movement condition by regenerative braking, such as a hybrid vehicle or an electric vehicle, durability may be enhanced under the bidirectional-movement condition where torsion torque is applied to the drive shaft in both a forward direction and a rearward direction.

As described above, the hollow drive shaft according to the present invention employs a structure obtained by swaging the hollow tubes having the same diameter as necessary and applying torsion torque thereto regardless of the unidirectional movement condition and the bidirectional-movement condition of the vehicle. Therefore, when the hollow drive shaft of the invention is applied to the eco-friendly vehicle as in the conventional hollow drive shaft, it is unnecessary to additionally make a hollow shaft material that is increased in thickness to cope with the bidirectional-movement condition of the vehicle.

Figure 5:
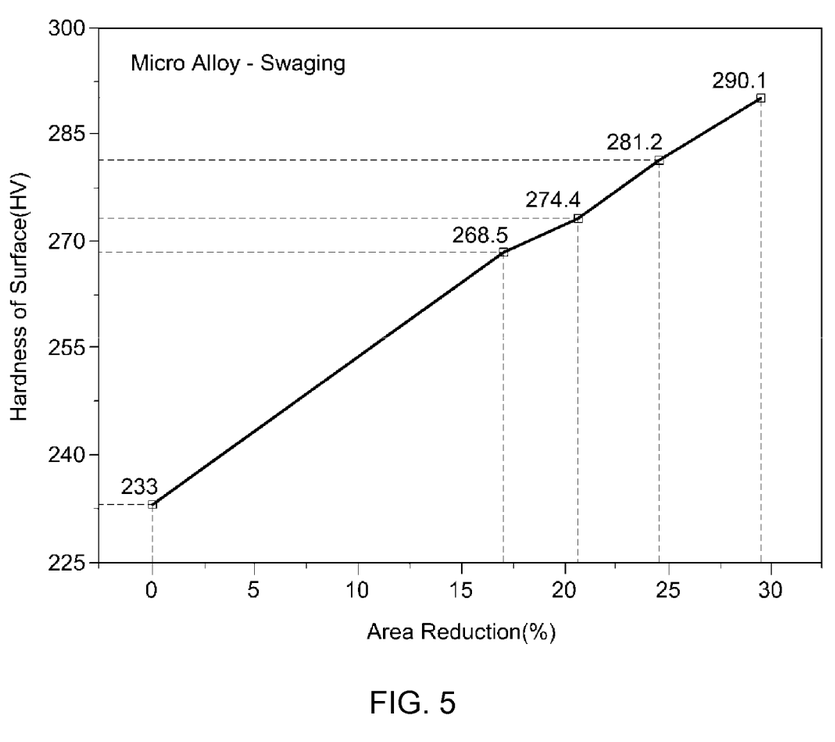
FIG. 5 and FIG. 6 are graphs showing change in physical properties during a swaging process of a hollow tube used when the exemplary hollow drive shaft according to the present invention is manufactured.
Figure 6:
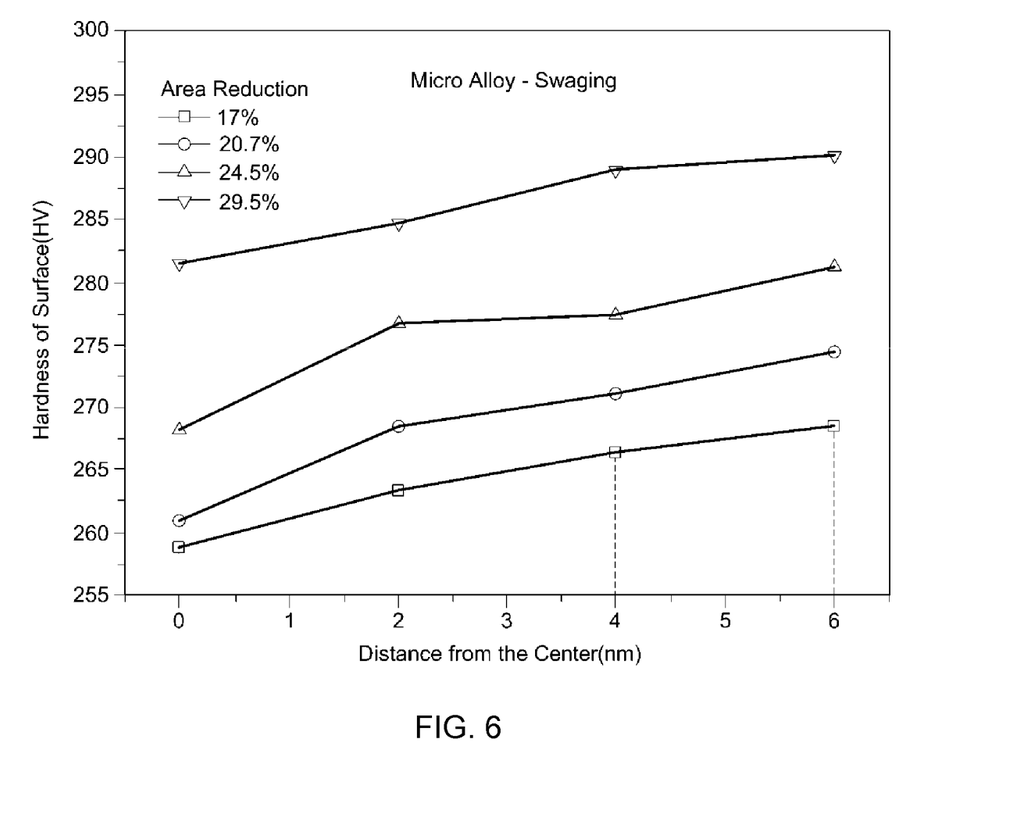

Meanwhile, FIGS. 5 and 6 are graphs showing change in physical properties when the hollow tube used to make the hollow drive shaft according to the present invention is subjected to swaging.

As shown in FIG. 5, when the hollow tube made of a micro-alloyed steel material is subjected to swaging, it is seen that the higher a sectional-area reduction ratio of the hollow tube is, the higher surface hardness of the hollow tube is.

Further, as shown in FIG. 6, after the hollow tube made of the micro-alloyed steel material is subjected to swaging, it is seen that radial hardness of the hollow tube is increased.

Thus, when the hollow tube having a circular cross-section is subjected to swaging, it is seen that, as the sectional-area reduction ratio of the hollow tube is increased, maximum tensile strength and hardness are linearly increased.

As described above, the present invention provides a hollow drive shaft for a vehicle and a manufacturing method thereof, which are enhanced in bidirectional-movement durability to cope with the bidirectional-movement condition of an eco-friendly vehicle without increasing the size of the drive shaft, thereby being applicable to both an internal-combustion-engine vehicle and an eco-friendly vehicle, and which are more advantageous in layout compared to a conventional hollow drive shaft having equivalent performance by increasing a size, thereby being applicable to even a vehicle to which the hollow drive shaft cannot be applied because of a problem concerning layout such as spacing between the drive shaft and peripheral parts.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a hollow drive shaft for a vehicle, comprising:
   swaging one of a first hollow tube and a second hollow tube having a same diameter to reduce an outer diameter thereof and thus allow the swaged hollow tube to be assembled in a remaining hollow tube of the first hollow tube and the second hollow tube;
   thereafter, applying torsion torque to the swaged hollow tube and the remaining hollow tube, respectively;
   thereafter, assembling the hollow tube that is reduced in outer diameter and to which the torsion torque is applied, into the remaining hollow tube to which the torsion torque is applied, thereby forming a hollow shaft; and
   joining first and second stems to both sides of the hollow shaft, respectively.

2. The method of claim 1,
   wherein when the torsion torque is applied to the swaged hollow tube and the remaining hollow tube, the torsion torque is applied to the swaged hollow tube and the remaining hollow tube in different directions.

3. The method of claim 1,
   wherein when the torsion torque is applied to the swaged hollow tube and the remaining hollow tube, the torsion torque is applied to the swaged hollow tube and the remaining hollow tube in a same direction.

* * * * *